US007822725B2

(12) United States Patent
Walliser et al.

(10) Patent No.: US 7,822,725 B2
(45) Date of Patent: Oct. 26, 2010

(54) METHOD AND DEVICE FOR DATA BACKUP

(75) Inventors: Stefan Walliser, Zimmern o.R. (DE);
Oliver Haug, Rottweil (DE); Yu Jiao,
Villingen-Schwenningen (DE); **Dejan
Volk, Rence (SI); Tomaz Beltram**, Nova
Gorcia (SI); Dario Rejc, Ljubljana (SI);
Igor Lautar, Trse (HR)

(73) Assignee: BDT-Solutions GmbH, Rottweil (DE)

( * ) Notice: Subject to any disclaimer, the term of this patent is extended or adjusted under 35 U.S.C. 154(b) by 521 days.

(21) Appl. No.: 11/671,001

(22) Filed: Feb. 5, 2007

(65) Prior Publication Data
US 2008/0126431 A1  May 29, 2008

(30) Foreign Application Priority Data
Nov. 24, 2006  (DE)  ........................ 10 2006 055 964

(51) Int. Cl.
*G06F 7/00* (2006.01)
*G06F 17/00* (2006.01)
(52) U.S. Cl. ...................... 707/698; 707/651; 707/999.2
(58) Field of Classification Search ................. 707/200, 707/203, 204, 651, 698
See application file for complete search history.

(56) References Cited
U.S. PATENT DOCUMENTS

| 6,546,404 | B1 | 4/2003 | Davis et al. |
| 6,704,730 | B2 * | 3/2004 | Moulton et al. ................ 707/6 |
| 6,810,398 | B2 | 10/2004 | Moulton |
| 6,826,711 | B2 | 11/2004 | Moulton et al. |
| 7,000,143 | B2 | 2/2006 | Moulton et al. |
| 2003/0105716 | A1 * | 6/2003 | Sutton et al. .................. 705/50 |
| 2004/0143713 | A1 * | 7/2004 | Niles et al. ................... 711/162 |
| 2004/0220975 | A1 * | 11/2004 | Carpentier et al. .......... 707/200 |

FOREIGN PATENT DOCUMENTS
WO        9418634 A    8/1994

* cited by examiner

*Primary Examiner*—Apu M Mofiz
*Assistant Examiner*—Jared M Bibbee
(74) *Attorney, Agent, or Firm*—Perkins Coie LLP

(57) ABSTRACT

A method for storing data with a first storage system and a second storage system, wherein the second storage system is used for backing up the data from the first storage system, wherein the first storage system comprises a file system on which the data that is to be backed up is stored, with a client that monitors the first storage system, and a server that administers the second storage system, with the method comprising the following steps:
  checking the files on the first storage system for any changes by the client, depending on one or several events;
  if changes have been detected, determining a hash value in relation to the file, which hash value is structured such that the identity of the file can be determined,
  transmitting the hash value to the server,
  checking, by means of the hash value, by the server as to whether the identical file is stored on the second storage system, and
if the file already exists, the file is not requested, but an annotation is made to the effect that the file is stored on the first storage system, and if the file does not exist, requesting the entire file, or parts of the file that have changed, from the first storage system, and storing the file on the second storage system, with an annotation relating to the first storage system.

10 Claims, 5 Drawing Sheets

METHOD AND DEVICE FOR DATA BACKUP

FIELD OF THE INVENTION

The present invention generally relates to a storage system, in particular to a backup- and archival system, which makes it possible to autonomously store and archive data from a multitude of computers and servers (clients). With increased frequency, ecological, political and social aspects of life are administered by way of digital data. Thus, transactions and the prosperity of our society are often generated on the basis of digital information. The quantity of data that has to be administered in the form of computer programs or databases is increasing exponentially. As a result of the increase in the performance of computers and operating systems, applications are becoming larger and larger. Furthermore, there is a desire to have permanent access to large databases, for example multimedia data bases or large files. The growth rate of data resulting from increased file sizes and multiple storage of identical files makes it necessary to back up and administer such files efficiently.

Due to the fact that an ever increasing number of data storage devices have to be used, there is continuous pressure on suppliers of storage solutions to reduce the costs of storage systems. Furthermore, data management systems should be scalable. They should not merely be in a position to handle current demand but also any expected future demand. Preferably, storage systems are incrementally scalable so that users can acquire the additional capacity whenever it is required at a corresponding point in time. Moreover, excellent availability and excellent reliability are important aspects because users do not accept data loss or data damage.

Furthermore, legal requirements in relation to the archival of data are becoming increasingly more stringent. Archival periods, data integrity, inalterability, data protection guidelines and access authority are increasingly prescribed in regulations and laws. For example, a multitude of documents have to be archived, at times in excess of 10 years, and administered so as to be secure against falsification in order to be able to provide proof of the existence and integrity of these documents.

Known storage systems that operate on the basis of hard disks often comprise a number of hard disks that are designed so as to be redundant (RAID: Redundant Array of Independent Disks). However, these systems are permanently online, they consume a considerable amount of electricity and are only of limited suitability for archival because data stored on these systems can be altered many times. These RAIDs often comprise RAID levels 1, 3, 5, 10 or 6 so as to prevent data loss. Furthermore, they comprise several controllers so that there is no single point of failure. Servers can be connected to these RAID systems, with such connection being implemented e.g. by way of TCP/IP/iSCSI (internet Small Computer System Interface), Fibre Channel or SCSI. Individual systems also provide the data via NAS (Network Attached Storage).

However, for data backup, tape drives are used which store the data on tapes. Such tape drives can also be installed in robots that transport the tapes to the individual tape drives. Essentially there are standard formats in the context of such tape drives, for example DDS, SDLT, LTO, AIT and SAIT. Other standards are also imaginable.

Known systems utilise backup- and archival programs that request data at regular intervals from the computers, and store such data on tapes. There is a central backup- and archival server which requests the data from the computers at regular intervals in order to make a backup of this data. Often however, data backup takes place every 24 hours so that a large part of the data is lost if the computer or the storage system crashes within this period of time. Furthermore, such backup software provides limited options for archiving data permanently and in a way that it cannot be altered.

U.S. Pat. No. 6,704,730, U.S. Pat. No. 6,810,398, U.S. Pat. No. 6,826,711 and U.S. Pat. No. 7,000,143 disclose storage systems and attempted solutions which are within the scope of the invention. FalconStor Software (falconstor.com), Quantum (quantum.com), Rocksoft, Sepaton (sepaton.com), DeltaStor, Diligent Technologies (diligent.com) with ProtectTIER VTL software, and Avamar Technologies (avamar.com) are providers of storage solutions in this field.

OVERVIEW OF THE INVENTION

It is the object of the present invention to provide a backup system which makes it possible at the shortest possible intervals to send data to a central storage location so that even users that use a mobile computer, e.g. a laptop, PDA or similar, back up all the data, even if these users work on the computer only for a short time. Furthermore, the quantity of data transferred is to be reduced. It should be noted that the invention is not limited to mobile computers. All types of computers that are connected to a network can be taken into account in the backup.

This object is met by an invention with the characteristics of the independent claims.

A preferred exemplary embodiment relates to a method for storing data with a first storage system and a second storage system, wherein the second storage system is used for backing up the data from the first storage system. The first storage system can be a PC, a special server such as e.g. an email server or a server hard disk/flash memory whose data is to be backed up. The data is stored as files in a file system. The first system comprises a client/agent which monitors the file system/s. Preferably, this client/agent is a software program. In a preferred embodiment, said client/agent is based on the Microsoft FindFirstChangeNotification® solution, which forms part of Microsoft Directory Management®, and which reports to the controlling client software of the present invention. A server is installed on a second system, which server administers the second storage system. As a rule, the server is software that runs on a computer with an operating system. The server administers the storage of the backed-up data on the second storage system. The second storage system is a hard disk RAID (flash RAID), preferably in combination with tape drives. These components are arranged hierarchically so that data migration can take place.

The method comprises the following steps:

The client checks the data and preferably the file system on the first storage system for any changes. This includes, in particular but not exclusively, any addition of new data and any change in already existing files and data records. This can occur at regular intervals or in an event-controlled manner (e.g. interrupt by the operating system, which provides notification if files have been changed).

If changes have been detected, a hash value in relation to the file is calculated, with the hash value being designed such that the identity of the file can be established. A change in the file can be determined by a change date or by filters or events provided by the operating system. The above are, for example, based on Microsoft FindFirstChangeNotification®, which forms part of Microsoft Directory Management®. Of course it is also imaginable that the change is notified by the hardware. The hash value is structured such that the identity of a file can be determined. In other words, the hash value is identical if the file is identical. In cases where changes to the file have been made, the hash value also changes. After the hash value has been determined it is transmitted to the server, which receives the hash value. As a rule, transmission is by way of a network, such as a LAN or WLAN. By means of the hash value, the server checks whether a corresponding copy of the file is already stored on the second storage system, because in a network there are often duplicates of files. Should this be the case, the server does not request the file anew, but instead establishes on the second storage system a further reference relating to the storage location of the file, as well as an entry which regulates access authorisation. In this process the first storage system is not changed. In concrete terms this means that the reference comprises on the one hand the identity of the client or of the computer and its hard disk, and on the other hand a possible volume and the storage place within the file system that has been established on the volume. In a preferred embodiment the server comprises a fast database (CAS), by means of which it is possible for said server to quickly access the hash values in order to determine whether or not these hash values have already been stored. Furthermore, in this database a reference to the file is stored on one or several client systems. Furthermore, access restrictions within the database can be stored. These access restrictions can also be obtained by way of an interface to the active directory of Windows. Other directory services such as LDAP are of course also imaginable.

The invention achieves a situation where the volume of traffic on the network is very small, and where if at all possible each file is stored only once on the second storage system (this does not take into account the redundancy of the second storage system). Explicitly, first of all only hash values are transferred by way of the network; and only in cases where data records and files have not yet been stored on the second storage system are these data records and files transferred once only over the network. In this way duplication and multiple storage of files can be prevented, and the use of the storage space on the second storage system can be optimised. Despite all this, the database makes it possible to make the files available individually to all the systems although the file has physically been stored only once.

If a check shows that the hash value does not exist, i.e. that the file is not yet present, then the server requests from the client system the entire file or parts of the file that have changed when compared to a previous file. Thereafter the file is stored on the second storage system, and the necessary information is supplied to the database. In contrast to this, if only part of the file has been transmitted, then either this part is completely reconstructed and stored on the second storage system, or only the changed parts are stored with a reference to the original complete file. However, it is also imaginable that a multitude of references exist, each reference reflecting different file versions in which at various points in time various changes have been made. If a file is to be restored, the server system then reconstructs the desired file in that all the changes are effected in sequence. First the original file is loaded, followed by the respective changes that were effected sequentially, which changes are then to be applied to the original file. Determining the changes or the parts that have been changed can on the one hand be effected by means of the hash value, or on the other hand by the client, which locally calculates the changes of the file on the basis of the original file. In this process the hash value is preferably structured such that it is always prepared for a defined number of bytes of a file (e.g. 1,000 bytes) so as to subsequently compose the total hash value from these individual hash values. In this way it is possible to determine which of the 1,000 byte blocks have changed. Alternative ways of calculating the changes are also imaginable and can be used. In a preferred embodiment only those blocks of the file are transmitted that have changed.

In an alternative embodiment, calculation of the change is undertaken by the server. Said server analyses the files and their predecessor versions and calculates the delta. Only the delta is then stored on the second storage system, together with a rule as to how this file is to be reconstituted. While in this way the entire file is transmitted by way of the network, it is, however, ensured that only the changes are stored on the server.

In a possible embodiment the hash value is stored such that an unambiguous relation to the clients and to the file on the second storage system can be established. In this process the path is stored on the file system in relation. Furthermore, the access authorisation is stored.

In the preferred embodiment the hash is an HSA1 hash based on 256 bits. The calculation method of this manufacturer is likely to be known. Information relating to the literature is provided below.

Preferably, the hash value is structured such that by means of the hash value it can be detected which blocks or regions of the file have changed, so that only those blocks that have changed are transmitted, and on the server this file is reconstituted by means of the existing file. Reconstitution can take place directly so that the part is completely stored on the second storage system, or it can be reconstituted only when a restoration copy has been requested. Details relating to this have already been described.

In a alternative embodiment the hash value is composed of several individual hash values. Thus the first part of the hash value can determine the first 10 MB of a file; the second part 10-90 MB, and the third part everything above it. It is, of course, also possible to have a finer gradation.

In a further alternative embodiment the hash value is expanded so that an allocation to a volume on the second storage system is evident from the hash value. Often, a storage system comprises a multitude of logically separate volumes that extend over one or several storage systems. In Microsoft operating systems, such volumes are, for example, designated by a letter. In Unix operating systems or Linux operating systems these volumes can be accessed by way of a path.

In order to ensure the highest possible data protection, the second storage system is set up so as to be redundant. Preferably, the storage system is even set up to provide multiple redundancy, as will be described below.

In this arrangement hierarchical storage models are taken into consideration. In hierarchical storage models the fastest and highest-quality storage devices are at the highest positions. These storage devices are fast hard disk systems with Fibre Channel, SCSI or SAS interfaces and fast rotary speeds (10,000 r/min and above). It is also imaginable that in future faster flash memories, holographic storage devices or optical storage technologies will assume this role. At present there is a trend towards combined systems with a hard disk and a flash memory so that it can be expected that in the long term the hard disk in its current form will play a lesser role. These fast and durable storage discs can be interconnected as RAIDs. This ensures high speeds and safe data keeping at the first level of the second storage system. A copy of the data is kept on a second storage region, which is somewhat slower, as part of the second storage system. This can be a SATA storage system or a storage system with lesser access times and with lesser rotary speeds. Permanent synchronisation takes place between these two hard disk systems so that data redundancy is provided: redundancy on the one hand as a result of the hard disk RAIDS on each hierarchical level, and on the other hand redundancy as a result of the use of two hard disk systems that are arranged parallel to each other and that are mirrored.

In the next hierarchical level a tape robot is arranged, which preferably but not mandatorily, comprises at least two tape drives, each of which writes data to two tapes in copy. This ensures that the data on the tapes is always present in duplicate independently of the other data. In future, tape technology might also be replaced by some other technology, such as e.g. flash memories, holographic storage devices or optical storage technologies.

As soon as the data is redundantly stored on the last hierarchical level it can be deleted, based on settable rules, from the higher-performing and more expensive storage levels so as to clear space thereon for new data. In this arrangement there is an automatic distinction between active and inactive data after the data has been classified.

By means of the tape system, which then also keeps the data in duplicate, the above-described data redundancy is obtained even if the data has been deleted from the technology components that rank higher in the hierarchy.

During data migration from one hierarchy to the next, an integrity check is carried out on the basis of the hash values. After the file has been written, or after the data to be shifted has been read, the hash value is generated and compared to the hash value stored in the database. If in this process any changes are detected, the copying process is to be carried out anew, or the data is to be loaded from another medium.

In a further exemplary embodiment, further duplicates of the tapes can be made, if desired, in order to store a copy of the data at an external location. The system that administers the second storage system is advised that a copy of all archived data is to be made. The tape robot asks the user to provide corresponding tapes onto which a copy of all data is then made and issued. In this arrangement it would also be possible to access an export function with integrated conversion to standard formats, e.g. .pdf data records.

Migration of data takes place automatically and can be predetermined in relation to time thresholds or data volumes. The alternative embodiment in addition comprises an archival function in the system, which archival function meets legal requirements and does not allow any change in the data after writing. To this effect, for example, a special tape medium can be used such as the WORM (Write Once Read Multiple) medium. Furthermore, it is imaginable that the data is given a signature that is obtained from a public-key infrastructure (PKI) system. General data verification can also take place by way of the implemented and already described HSA-1 calculation. The detailed process of archival is subject to standard processes which hereinafter are not described in more detail because they are well known to the average person skilled in the art. However, the device ensures that the archived data cannot be changed.

The system further provides an option, by way of a user interface, to determine the types of files to be archived and the positions of the first storage system in which positions the files are stored. In this way a user can determine which files are to be backed up, which files are to be archived, and which files are to be indexed for the purpose of a contents search.

In order to ensure that data is not damaged during migration between the individual hierarchical levels, the hash values are used to verify the data after it has been copied to the new storage medium or the new hierarchical level. By means of the signature key it is also possible to check that the data has not been changed. This ensures that data integrity and consistency are maintained across all hierarchical levels. Prior to data transmission, the hashes are calculated from the first storage system, stored in a database in the server, and recalculated after the data has been stored in the second storage system. The two values are compared to each other, and data integrity and consistency can thus be ensured. The same process is carried out once more when data is copied and migrated within the storage hierarchy of the second storage system.

In a further embodiment, the invention is extended to cover e-mail traffic. In the alternative embodiment the MS ExchangeServer by Microsoft® is supported (however, other mail systems are imaginable). Access to its e-mails is by a predetermined interface, for example the MAPI interface, with data backup and archival of the e-mail being carried out according to the same principle as with files. However, there is a significant difference in that the hash value is not applied to the entire file or e-mail (but separately, in addition, also to its attachments) but instead in each case separately to the e-mail itself and to its attachments. This is because it is often the case that a multitude of identical attachments are located in a mail server, so that their storage entails an enormous overload of the system. Within a mail group, attachments are frequently sent to many participants so that said attachments are held in duplicate or multiple times by users. In order to avoid large storage requirements and increased network load during backup or archival, only those attachments are stored on the second storage system which have previously not been able to be identified by means of the calculated hash values. In relation to this attachment, an annotation/pointer is then made in the database, stating that said attachment belongs to a specific e-mail. Consequently, in relation to a hash value it is possible to reference not only one file to a file system, but also a file within one or several e-mails.

This approach can be taken on the one hand by a client which runs on the mail server and accesses the entire mail traffic by way of an interface of the mail server, or on the other hand by a client which runs on the client computers on which a mail client (e.g. Outlook) is installed so as to access all mails by way of an interface of Outlook (or IMAP, POP, MAPI etc.).

In this way, for the purpose of monitoring mail traffic, on each client that administers or comprises a mail client, monitoring can take place locally in order to then communicate with the server and in order to transmit the e-mails and their attachments if applicable.

In the alternative exemplary embodiment with respect to an exchange server, the access to the journaling mailbox is given by way of a corresponding API. The hash value is calculated (for the mail itself and if applicable for its attachments). If the mail has not yet been backed up, it is indexed for a full-text search and is then copied to the second storage system with a respective reference and access authorisation. The journaling mailbox thus temporarily makes the e-mails available for processing. After a predeterminable period of time the e-mails will then be deleted. However, in parallel to the above, the e-mails have already been transmitted to the recipient.

This approach can be further developed for other storage systems such as databases. It is understood that considering the exchange server should not result in any limitations relating to the applicability of this method. Mail servers by IBM®, such as Lotus Notes® or a host of e-mail servers in the Unix® and Linux® fields can also be covered by this approach. With these systems, too, on the basis of the stored information a search takes place to check whether there are files that are present multiple times so that multiple storage is avoided. There are also database structures (BLOBs, Binary Large Objects) that accommodate entire files. For these data structures the avoidance of duplicates would be of interest.

Single instancing can thus also be practised for mails and furthermore between all the described applications. Thus application-spanning single instancing is implemented so that for example backup, archive and NAS (Network Attached Storage) access the same physical data level. This approach can also be considered for Fibre Channel systems, iSCSI systems and document management systems.

In an alternative embodiment such monitoring is carried out regularly at 30-minute intervals. Of course other intervals, which can be set, are also imaginable. This decisively depends on the daily generated data volume and thus on the load on the computer systems.

Basically, the invention makes it possible to specify the interval at which, and the extent to which, data is to be backed up and archived. It is imaginable for a file to be monitored every 30 minutes on the first storage system and to back it up if required. Shorter intervals are also imaginable. Furthermore, the length of time this data or these files are to be kept for a total backup can be specified. For example it can be ensured that the data is to be kept on the first storage system for 3 months. For archival it can for example be specified that the data is to be archived for 10 years. Furthermore, selection criteria can be determined that selectively determine or exclude files that are to be backed up or archived, or that are not to be backed up. This can take place by way of selection patterns with placeholders, or by way of other selection criteria that are determined via a graphic user interface. Furthte a Classification of the data takes place so that a differentiation between active and inactive data can be made, so that the data is on different levels of the HSM, depending on the classification (access frequency, last modification, creation date).

This user interface can be addressed by way of a web browser, like a web server. Alternatives by way of software administration clients are of course also imaginable.

In order to make it possible to restore files without having to contact the administrator, the server comprises a web server that makes it possible, by way of an input mask, to state selection criteria that are used to determine the files that are to be restored. This can take place either by direct input of the file name or by navigation within a file system in the form of a tree. Access to a file is, of course, limited by way of an authorisation check so that not all available files can be restored by each user, but only those files for which a given user has authorisation. Authorisation can be obtained either by the authorisation system of Microsoft (active directory), or by entering user name and password that are based on the systems own authorisation system.

In addition, the server can be integrated by iSCSI or TCP/IP as network-attached storage, NAS (file share) so that said server is not only used for data backup, but in addition also for the provision of storage space in the network. To users it is then not evident that in each case they are dealing with a special backup system. Instead, the characteristic of the operating system that is used on the server system is used to provide further services for the users in the network. A Windows Storage Server® is used, as the alternative operating system, on the backup server which administers the second storage system. This operating system provides the described interfaces and services. It is also imaginable to use some other operating system such as Linux or Unix.

Further components of the invention include the monitoring of the mail traffic, the integrity of the files in a hierarchical storage system, and the design of the client, which as a rule runs as software on a PC or computer, or the server itself, which as a rule is implemented as software, or is a combination of software and hardware and is installed on a server that administers several RAID systems. In this case the server in turn is connected to a backup system or to a tape library by way of Fibre Channel, iSCSI or SCSI.

BRIEF DESCRIPTION OF THE FIGURES

Below, the figures to which the detailed description refers are described in brief.

DETAILED DESCRIPTION OF THE INVENTION

Figure 1:
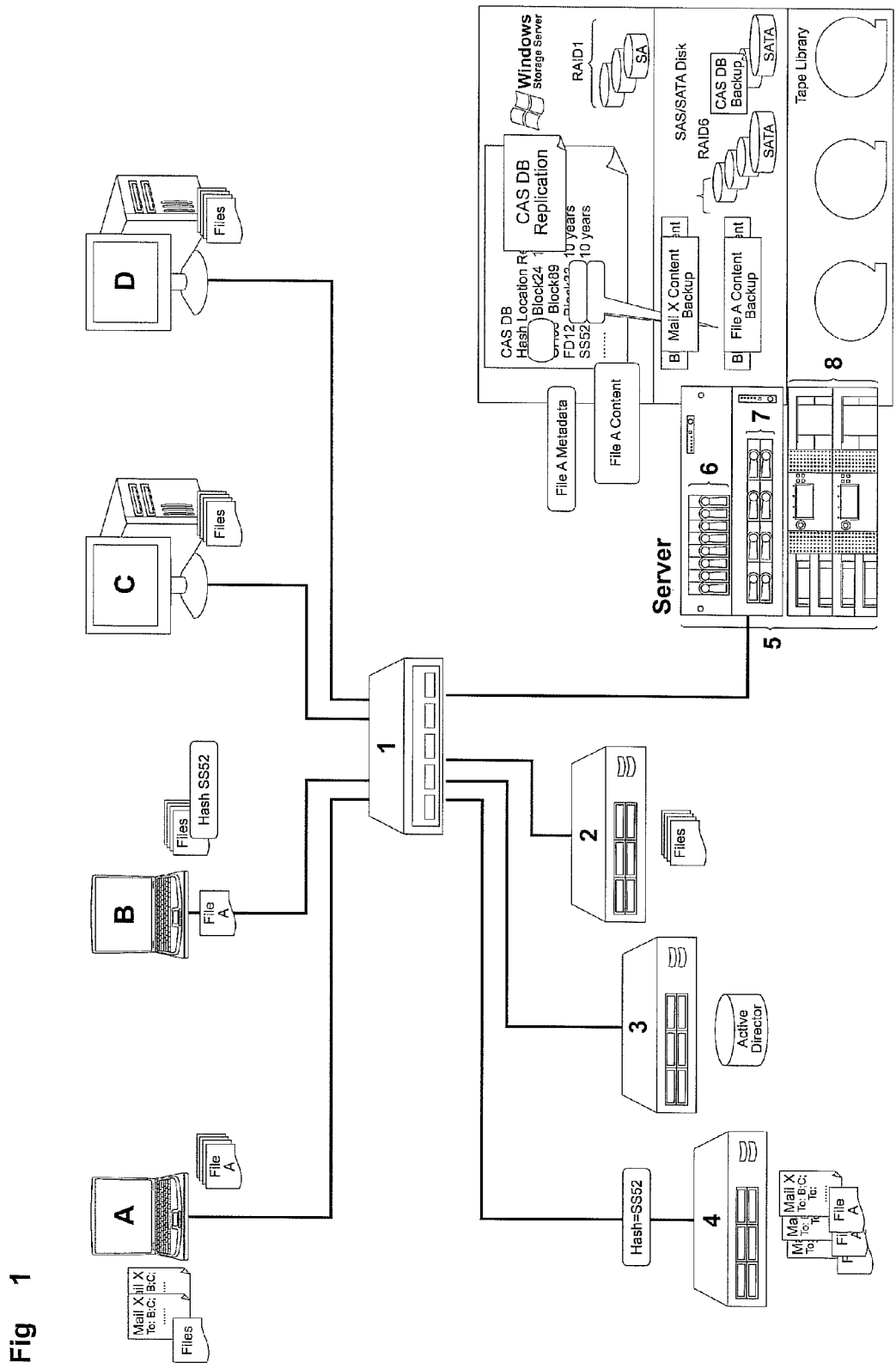
FIG. 1: shows a network with a central switch to which a number of PCs are connected, which by way of this switch are connected to the backup system on which the server runs.
Figure 2:
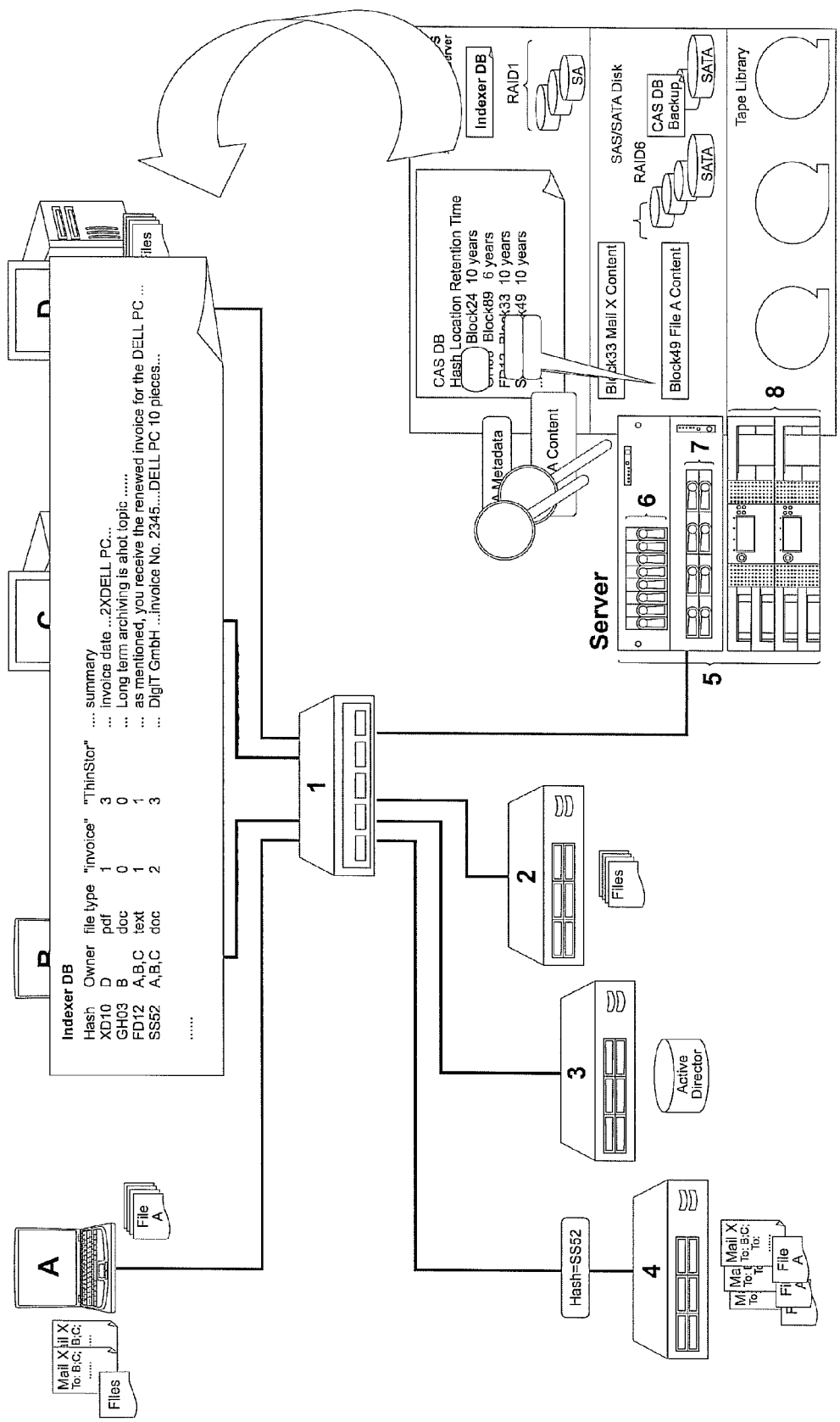
FIG. 2: shows a network with a central switch to which a number of PCs are connected, which by way of this switch are connected to the backup system, with a structure of the central database (CAS)

FIG. 1 shows a central switch 1 to which a number of workstations A, B, C and D are connected, which in turn have their data stored on file servers 2, 3. Furthermore, a mail server 4 is connected to the network. The device 5 according to the invention is also integrated in the network. On the individual work stations A, B, C and D as well as on the servers 2, 3, 4 the client runs, while the server runs on the device 5 according to the invention. The device 5 according to the invention comprises a hierarchical storage system that is made up from a fast storage system 6, a somewhat slower storage system 7 and a tape system 8. On the workstation B, a file A that is to be backed up is determined by the client. A hash value SS52 is calculated and sent to the server 5. The server checks whether this hash value already exists in the database (CAS). Since this file has already been backed up by the workstation A, no request for the entire file is issued, instead only a new entry is made in the database (CAS), which entry refers to client B. The details of this database entry are shown in FIG. 2. Furthermore, on the mail server there is an item of mail X, which has file A as an attachment. This file, too, is not transferred to the device 5 by the client, because it is already stored on the hierarchical storage system of the device according to the invention. Instead, a reference is entered in the database (CAS).

FIG. 2 shows a section of the database (CAS). For each file there is an entry in the table. The entry comprises the hash value and the owner, wherein the owner is the computer on which the client runs. The table shows that for the files with the hash value FD12 and SS52 there are three owners (access authorisations). Furthermore, the table shows where they are stored on the storage system. The information comprises the original path, the time to be stored, which is separated for backup and archival. Indexing information is done to get a fast access to the data.

Data can thus be stored on the first level 6, the second level 7, and the third level, namely on the tape backup system 8. The diagram clearly shows that the file with the hash value SS52 is stored on the second level and in addition as a copy on the third level, i.e. on the slower tape system 7. Furthermore there is an overview of the content of these files.

Figure 3:
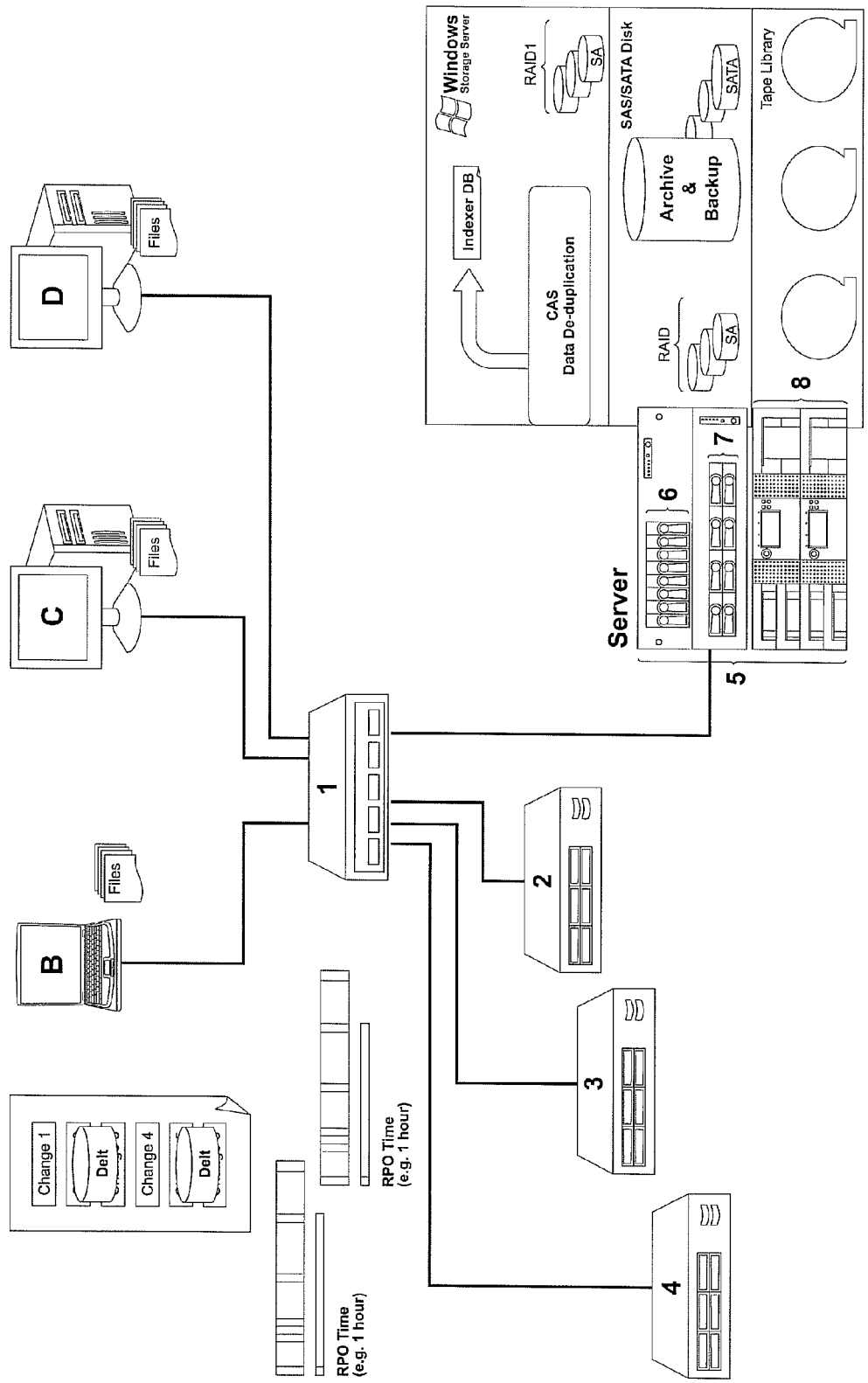
FIG. 3: shows a network to which a number of PCs are connected, which by way of the aforesaid are connected to the backup system, wherein only parts of the files are transmitted.

FIG. 3 shows a further special characteristic in which the differences of the files are determined, and thus only those parts of a file are transmitted that have been changed. Consequently the delta of the file that is stored on the client is calculated. The method used for calculating the delta has already been described above. Furthermore, this file is stored on the computer. The difference is calculated by the client, which on request transmits the difference to the device 5 according to the invention. As a rule it only makes sense to transmit the difference in those cases where a file is very frequently changed and the backup interval is very short. This can be the case in files where frequent changes are made, for example in database files, so that it is not necessary always to transmit the entire database file but instead only the part of this file that has changed. On the backup server the files are subsequently completely reconstituted, a process which is possible because the history of the delta changes is available, and the file can thus be reconstituted piece by piece.

Figure 4:
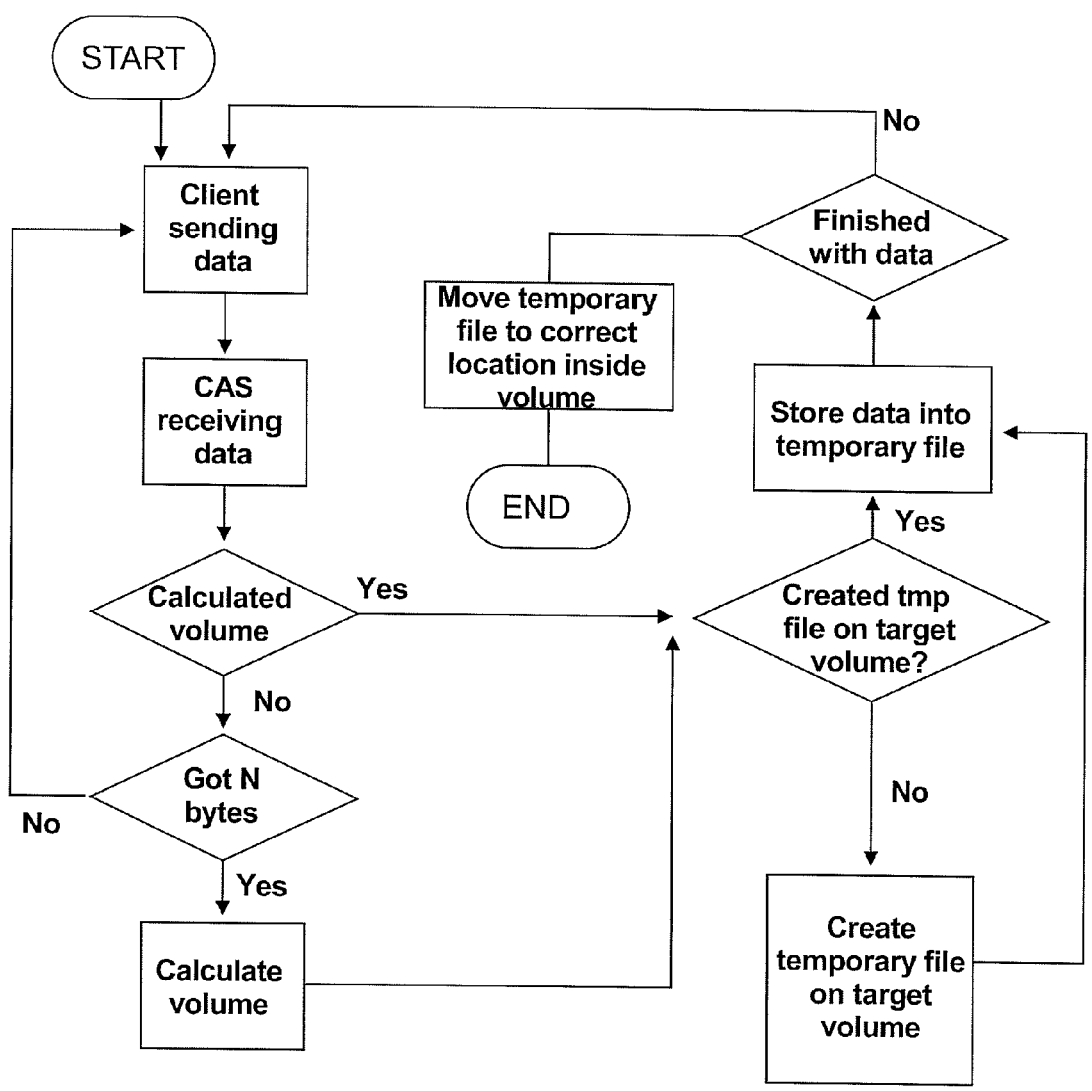
FIG. 4: shows a flow chart for checking the hash values.

FIG. 4 show a flow chart of the present invention, which flow chart is used for calculating the hash value.

SHA1 is a well-known algorithm for calculating the HASH value. This hash value is a value of a fixed size, irrespective of the length of the input. The size is 160 bits. There are also other variants of the SHA, which variants have a larger number of bits, as a rule 256 bits (SHA-256 . . . ).

Methods for calculation are described in RFC 3174 (http://www.rfc-archive.org/getrfc.php?rfc=3174) so that there is no need to discuss them in this document.

However, in the alternative embodiment an expanded ABSHASH is used. This expanded ABSHASH is used to improve the efficiency of the backup system. The backup system according to the invention comprises a number of volumes depending on the storage capacity of the hard disk systems that are used. In the end the database (CAS) has to make a decision as to the volume on which the files that are transmitted are to be stored. To avoid frequent copying operations the HASH value has been adapted accordingly so that it shows the volume in which the objects or files are to be filed. To this effect two additional bytes are used, whose purpose it is to determine the volume on which the file is to be stored. This results in the complete hash value then comprising 176 bits. The volume is calculated taking into account the total number of volumes. To this effect a corresponding modulo operation is used.

FIG. 4 shows that the client transmits data. The server receives the data and checks whether the hash has been calculated in respect of this data. If this is not the case, the server checks whether a certain number of N-bytes have already been received. If this is also not the case, data is further received by the client. If N-bytes have already been received, the volume is calculated. The same occurs if the hash value has already been calculated. A check is made whether a temporary file has already been created in the corresponding volume. If this is the case the data is stored in the temporary file. If this is not the case, first a temporary file is created in which the data is then stored. After this file has been backed up the file is moved to the correct position within the volume. As a rule this can be achieved very easily because it is only a matter of changing the pointer, while there is no need to carry out a copy operation.

Figure 5:
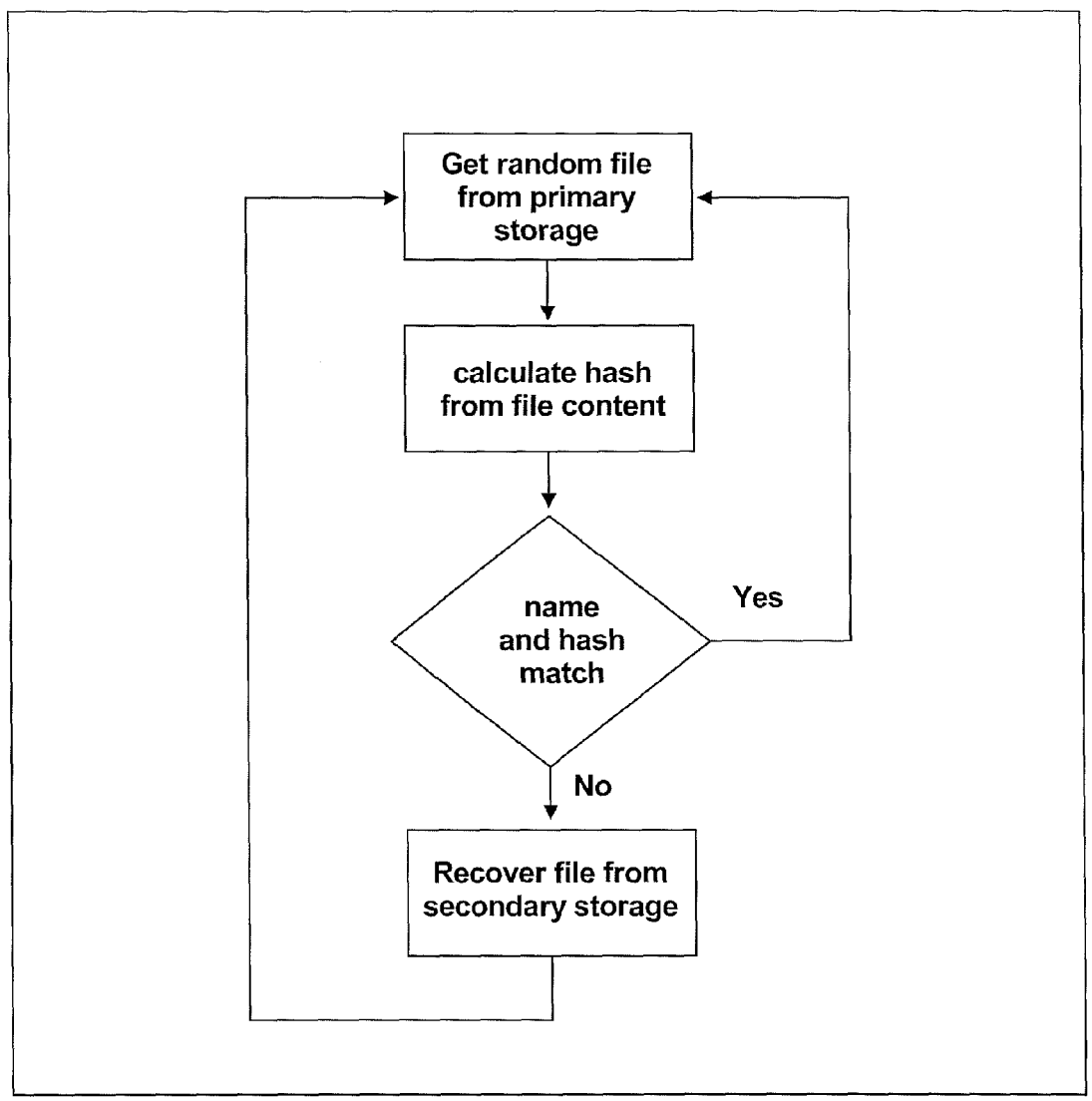
FIG. 5: shows a flow chart for checking the hash values after renewed downloading of data.

FIG. 5 shows a transfer of the files from different storage levels. Externally, a request for restoring a certain file is made. The corresponding file is located on storage level 7. A check is made whether the newly calculated hash tallies with the name and the hash from the database. If this is the case, the file is provided; if this is not the case, the file is loaded from the storage system 8, in this case from the tape level, in order to make said file available.

The alternative embodiments described in this document are not intended to limit the invention in any way. Instead, they have been provided to help understand the invention. The scope of protection of the invention is to be determined solely by the enclosed claims.

The invention claimed is:

1. A method for the safe transfer of data in a hierarchical storage system having a plurality of volumes, with the storage system comprising storage devices of different speeds, wherein the data automatically migrates from one hierarchy to another according to predeterminable criteria, comprising the following steps:
    generating a first hash value for the data, from which hash value the identity of the data can be established prior to migration, wherein a ABSHASH is used, to avoid frequent copying operations the ABSHASH value has been adapted with additional bytes accordingly so that it shows the volume in which the objects or files are to be filed,
    checking the integrity of the data after migration by reading the data and generating a second hash value so that it can be compared with the first hash value; and
    if the hash values do not agree, renewed copying of the data.

2. The method according to the claim 1, wherein the hash value is stored in a database so that fast access is made possible, wherein the database is preferably stored so as to be redundant.

3. The method according to the claim 1, wherein the data relates to files or e-mails.

4. The method according to the claim 1, wherein during storing and loading, checks are made, by means of the hash value, as to whether the data is correct.

5. The method according to the claim 1, wherein the hash is an SHA1 hash.

6. A hierarchical storage system comprising storage devices of different speeds having a plurality of volumes, which storage devices are arranged in a hierarchy, wherein data automatically migrates between the hierarchies according to predeterminable criteria, comprising the following components:
    means for generating a first hash value for data, from which hash value the identity of the data is determinable prior to migration, wherein a ABSHASH is used, to avoid frequent copying operations the ABSHASH value has been adapted with additional bytes accordingly so that it shows the volume in which the objects or files are to be filed;
    means for checking the integrity of the data after migration by reading the data and generating a second hash value so that it can be compared with the first hash value; and
    if the hash values do not agree, the means undertake renewed copying of the data.

7. The device according to the preceding claim 6, wherein the hash value is stored in a database so that fast access is made possible, wherein the database is preferably stored so as to be redundant.

8. The device according to claim 6, wherein the data relates to files or e-mails.

9. The device according to claim 6, wherein means are provided which during storing and loading, check the hash value, as to whether the data is correct.

10. The device according to claim 6, wherein the hash is an SHA1 hash.

* * * * *